United States Patent [19]

Aihara

[11] Patent Number: 5,548,406
[45] Date of Patent: Aug. 20, 1996

[54] APPARATUS FOR PERFORMING RECORDING OPERATIONS BY USING STANDARD TYPE RECORDING PAPERS AND METHOD OF CONTROLLING SAID APPARATUS

[75] Inventor: Masayoshi Aihara, Tokyo, Japan

[73] Assignee: Kabushiki Kaisha Toshiba, Kawasaki, Japan

[21] Appl. No.: 459,520

[22] Filed: Jun. 2, 1995

Related U.S. Application Data

[63] Continuation of Ser. No. 46,371, Apr. 13, 1993, abandoned, which is a continuation of Ser. No. 815,864, Jan. 2, 1992, abandoned, which is a continuation of Ser. No. 668,823, Mar. 13, 1991, abandoned.

[30] Foreign Application Priority Data

Mar. 13, 1990 [JP] Japan ................................. 2-60064

[51] Int. Cl.$^6$ ............................. H04N 1/23; H04N 1/387
[52] U.S. Cl. ................................... 358/296; 358/449
[58] Field of Search ................................ 358/296, 304, 358/404, 406, 448, 449, 452, 453

[56] References Cited

U.S. PATENT DOCUMENTS

| | | | |
|---|---|---|---|
| 4,704,636 | 11/1987 | Yano | 358/449 X |
| 4,706,127 | 11/1987 | Nobuta | 358/449 |
| 4,731,658 | 3/1988 | Koseki | 358/449 |
| 4,789,900 | 12/1988 | Takahashi | 358/449 X |
| 4,814,894 | 3/1989 | Yoshida | 358/449 X |
| 4,855,839 | 8/1989 | Saito | 358/449 X |
| 4,924,324 | 5/1990 | Takaoka | 358/449 X |
| 4,933,771 | 6/1990 | Matsuura et al. | 358/296 |
| 4,956,723 | 9/1990 | Toda | 358/449 |
| 5,072,306 | 12/1991 | Matsumoto et al. | 358/304 |
| 5,140,430 | 8/1992 | Horii et al. | 358/296 |
| 5,150,224 | 9/1992 | Mizude et al. | 358/449 |

*Primary Examiner*—Peter S. Wong
*Assistant Examiner*—Eric Frahm
*Attorney, Agent, or Firm*—Finnegan, Henderson, Farabow, Garrett & Dunner, L.L.P.

[57] ABSTRACT

An apparatus for performing a recording operation by using standard type recording papers wherein data are outputted by printing them on one of the standard type recording papers as well as a method of controlling the foregoing apparatus are disclosed. When all informations are important and image data of the kind including informations within the critical range relative to recording papers each having a standard size are printed, a standard type recording paper having a length enough long to allow all the data to be effectively printed on a single page of standard type printing paper is fed to a recording section from which the data are outputted by printing them on a single page of standard type printing paper, in any case where the data having a quantity corresponding to a single page exceeds the length by which an effective printing operation can be performed for the standard type printing paper. Otherwise, the data are outputted by printing them on two pages of standard type recording papers.

10 Claims, 3 Drawing Sheets

APPARATUS FOR PERFORMING RECORDING OPERATIONS BY USING STANDARD TYPE RECORDING PAPERS AND METHOD OF CONTROLLING SAID APPARATUS

This application is a continuation of application Ser. No. 08/046,371, filed Apr. 13, 1993, now abandoned which is a continuation of application Ser. No. 07/815,864, filed Jan. 2, 1992, now abandoned which is a continuation of application Ser. No. 07/668,823, filed Mar. 13, 1991, now abandoned.

BACKGROUND OF THE INVENTION

1. Field of the Invention

The present invention relates generally to an apparatus for performing a recording operation by using standard type recording papers wherein data are output by printing them on a standard type recording paper and a method of controlling the foregoing apparatus. More particularly, the present invention relates to a recording apparatus preferably employable for a facsimile unit and a method of controlling the foregoing apparatus.

2. Description of the Related Art

In recent years, a laser printer or the like apparatus has been practically used as a recording section in a facsimile unit. To operate the laser printer, a recording paper cut to a standard size has been heretofore used so as to allow data input from the facsimile unit to be recorded on the printing paper.

With respect to the facsimile unit as constructed in the above-described manner, the range where a recording operation can be performed for the recording paper which has been cut to size is not set to the critical dimensions specified for the cut recording paper but the foregoing range is usually determined appreciably narrower than the critical dimensions.

Therefore, even in a case where a manuscript on the signal sending side is written on a recording paper having an A-5 size, there is a possibility that the range where a recording operation can be performed in response to the received image signals exceeds the range where a recording operation can practically be performed for a standard type recording paper having an A-5 size on the signal receiving side.

To prevent a part of the information on the received image from failing to be recorded, data representative of the received image have been hitherto recorded on two and more standard type recording papers each having an A-5 size so as to allow the recorded data to be reliably output to a user.

However, in a case where a quantity of the received image data slightly exceeds the range where a recording operation can be performed for a recording paper having an A-5 size, a large part of the second recording paper is not subjected to printing and thereby it is kept in a completely blank state, resulting in the recording paper being consumed uselessly.

In view of the foregoing fact, to prevent useless consumption of the recording paper as mentioned above, a proposal has been made in such a case where an extra part in excess of the range where a recording operation can be performed for a recording paper having an A-5 size has a quantity smaller than a predetermined threshold, the extra part is discarded and the received image data are then recorded in a single page of standard type recording paper having an A-5 size so as to allow the recorded data to be output.

In addition, another proposal has been made in the following manner.

For example, also with respect to a printer which is constructed such that one of two kinds of standard type recording papers each cut to size to have a same width in the main scanning direction but have different lengths, e.g., A-4 and A-5 is selected and the selected recording paper is fed to a printing section, in a case where a manuscript on the signal sending side is prepared to have an A-5 size, the received image data have a length longer than the length by which an effective recording operation can be performed for an A-5 sized standard type recording paper and a quantity of the extra part in excess of the range where a recording operation can be performed for the standard type recording paper having an A-5 size is smaller than a predetermined threshold, the extra part is discarded and the standard type recording paper having an A-5 size is fed to the printer in which a printing operation is performed for the standard type recording paper.

However, in a case where the recording range for data to be printed slightly exceeds the range where a recording operation can be performed for a recording paper having a standard size, when control is carried out such that a printing operation is performed while the extra part is discarded at all, there is a possibility that important information will fail to be recorded, depending on the kind of data to be printed. In some cases, however, there arises a problem that the important information cannot be printed after completion of the recording operation.

For example, in a case where image data are created in the facsimile unit like at the time of a sending/receiving signal, list output, or the like, and the image data are then printed so as to allow them to be output, all the information is important and the image data often includes information which remains within the critical range relative to recording papers each having a standard size. Therefore, when the foregoing kind of data are printed, if a length of the recorded data becomes longer than the length by which an effective printing operation can be performed for a standard type recording paper and moreover the extra part in excess of the range where a printing operation can be performed for the standard type printing paper has a quantity smaller than a predetermined threshold, there arises another problem that important information fails to be recorded and printed, when the facsimile unit is constructed such that the extra part is discarded and a standard type printing paper is fed to the printer in which a printing operation is performed.

SUMMARY OF THE INVENTION

The present invention has been made so as to obviate the foregoing problems.

An object of the present invention is to provide an apparatus for performing a recording operation by using standard type recording papers wherein the apparatus is constructed such that a control for performing a printing operation while an extra part of image data is discarded in a case where a length of image data to be printed exceeds the length by which an effective recording operation can be performed for a standard type recording paper and the extra part has a value smaller than a predetermined one is automatically shifted to a control for selecting another standard type recording paper so as to prevent image data to be printed from failing to be recorded or performing a printing operation by using two kinds of standard type recording papers in a case where a length of the image data exceeds the length by which an effective printing operation can be performed for the standard type printing paper, corresponding to the kind of image data to be printed and vice versa.

Another object of the present invention is to provide a method of controlling the foregoing apparatus.

To accomplish the former object, the present invention provides an apparatus for performing a printing operation by using standard type recording papers, wherein the apparatus comprises a recording paper selecting section adapted to select one of a plurality of standard type recording papers having plural sizes; a printing adjusting section adapted to discard an extra part in excess of the length by which an effective recording operation can be performed for the selected standard type recording paper which has been selected by the recording paper selecting section, if the extra part remains within a predetermined range, and then perform a printing operation for the standard type recording paper, in a case where it is found that image data having a quantity corresponding to a single page exceed the length by which an effective printing operation can be performed for the selected standard type recording paper which has been selected by the recording paper selecting section; a determining section for determining the kind of image data to be printed; and a printing control section adapted to stop the printing operation which has been performed with the aid of the printing adjusting section, in a case where it is found that the kind of the image data which has been determined by the determining section is a predetermined kind of image data, the printing controlling section serving to allow a printing operation to be performed after the selected standard type recording paper which has been selected by the recording paper selecting section is changed to a standard type printing paper having another size which assures that the image data can completely be printed on the standard type printing paper having another size.

In addition, the present invention provides an apparatus for performing a recording operation by using standard type recording papers, wherein the apparatus comprises a printing adjusting section adapted to discard an extra part in excess of the length by which an effective recording operation can be performed for a predetermined standard type recording paper, if the extra part remains within a predetermined range, in a case where it is found that image data having a quantity corresponding to a single page exceeds the length by which an effective recording operation can be performed for the predetermined standard type recording paper; a determining section for determining the kind of image data to be printed; and a printing controlling section adapted to stop the printing operation which has been performed with the aid of the printing adjusting section, in a case where it is found that the kind of image data which has been determined by the determining section is a predetermined kind of image data, the printing controlling section serving to allow the image data to be printed on two pages of the standard type recording papers.

To accomplish the latter object, the present invention provides a method of controlling an apparatus for performing a recording operation by using standard type recording papers, wherein the method comprises a recording paper feeding step of feeding to a recording section one standard type recording paper selected from a plurality of standard type recording papers having plural sizes; a first determining step of determining whether or not image data having a quantity corresponding to a single page exceeds the length by which an effective recording operation can be performed for the standard type recording paper which has been selected at the recording paper selecting step; a second determining step of determining whether or not an extra part in excess of the length by which an effective recording operation can be performed for the standard type recording paper which has been selected at the recording paper feeding step remains within a predetermined range, in a case where it has been determined at the first determining step that the image data having a quantity corresponding to a single page exceed the length by which an effective recording operation can be performed for the selected standard type recording paper; a printing adjusting step of discarding the extra part and then allowing a printing operation to be performed for the remaining part of the selected standard type recording paper, in a case where it has been determined at the second determining step that the extra part in excess of the length by which an effective recording operation can be performed for the standard type recording paper remains within the predetermined range; a step of allowing a printing operation to be performed after the standard type recording paper which has been fed at the recording paper feeding step is changed to a standard type recording paper having another size which assures that the image data can completely be printed on the standard type printing paper having another size, in a case where it has been determined at the second determining step that the extra part in excess of the length by which an effective recording operation can be performed for the standard type recording paper does not remain within the predetermined range; a determining step of determining the kind of image data to be printed; and a printing controlling step of stopping the printing operation which has been performed at the printing adjusting step, in a case where the kind of the image data which have been determined at the determining step is a predetermined kind of image data, and then performing a printing operation after the standard type recording paper which has been fed at the recording paper feeding step is changed to the standard type recording paper having another size which assures that the image data can completely be printed on the standard type recording paper having another size.

Additionally, the present invention provides a method of controlling an apparatus for performing a recording operation by using standard type recording papers, wherein the method comprises a first determining step of determining whether or not image data having a quantity corresponding to a single page exceeds the length by which an effective recording operation can be performed for a predetermined standard type recording paper; a second determining step of determining whether or not an extra part in excess of the length by which an effective recording operation can be performed for the standard type recording paper remains within a predetermined range, in a case where it has been determined at the first determining step that the image data having a quantity corresponding to a single page exceeds the length by which an effective recording operation can be performed for the standard type recording paper; a printing adjusting step of discarding the extra part in excess of the length by which an effective recording operation can be performed for the standard type recording paper, in a case where it has been determined at the second determining step that the extra part remain within the predetermined range, and then performing a printing operation for the standard type recording paper; a step of printing the image data on two pages of the standard type recording papers, in a case where it has been determined at the second determining step that the extra part in excess of the length by which an effective recording operation can be performed for the standard type recording papers does not remain within the predetermined range; a determining step of determining the kind of image data to be printed; and a printing controlling step of stopping the printing operation which has been performed at the printing adjusting step, in a case where it is found that the kind of image data which has been determined at the determining step is a predetermined kind of image data, and then printing the image data on two pages of the standard type recording papers.

According to the present invention, since the apparatus for performing a recording operation by using standard type recording papers is constructed in the above-described manner and the method of controlling the foregoing apparatus is practiced in the above-described manner, even in a case where image data to be printed exceed the length by which an effective recording operation can be performed for a standard type recording paper and the extra part is smaller than a predetermined value, control is not carried out depending on the kind of image data such that the extra part of the image data in excess of the length by which an effective recording operation can be performed for the standard type recording paper is discarded and a printing operation is then performed for the remaining part of the standard type recording paper. Thus, the standard type recording papers can effectively be used and a malfunction of causing the image data to fail to be recorded and printed can be prevented reliably.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail hereinafter with reference to the accompanying drawings which illustrate a preferred embodiment of the present invention.

Figure 1:
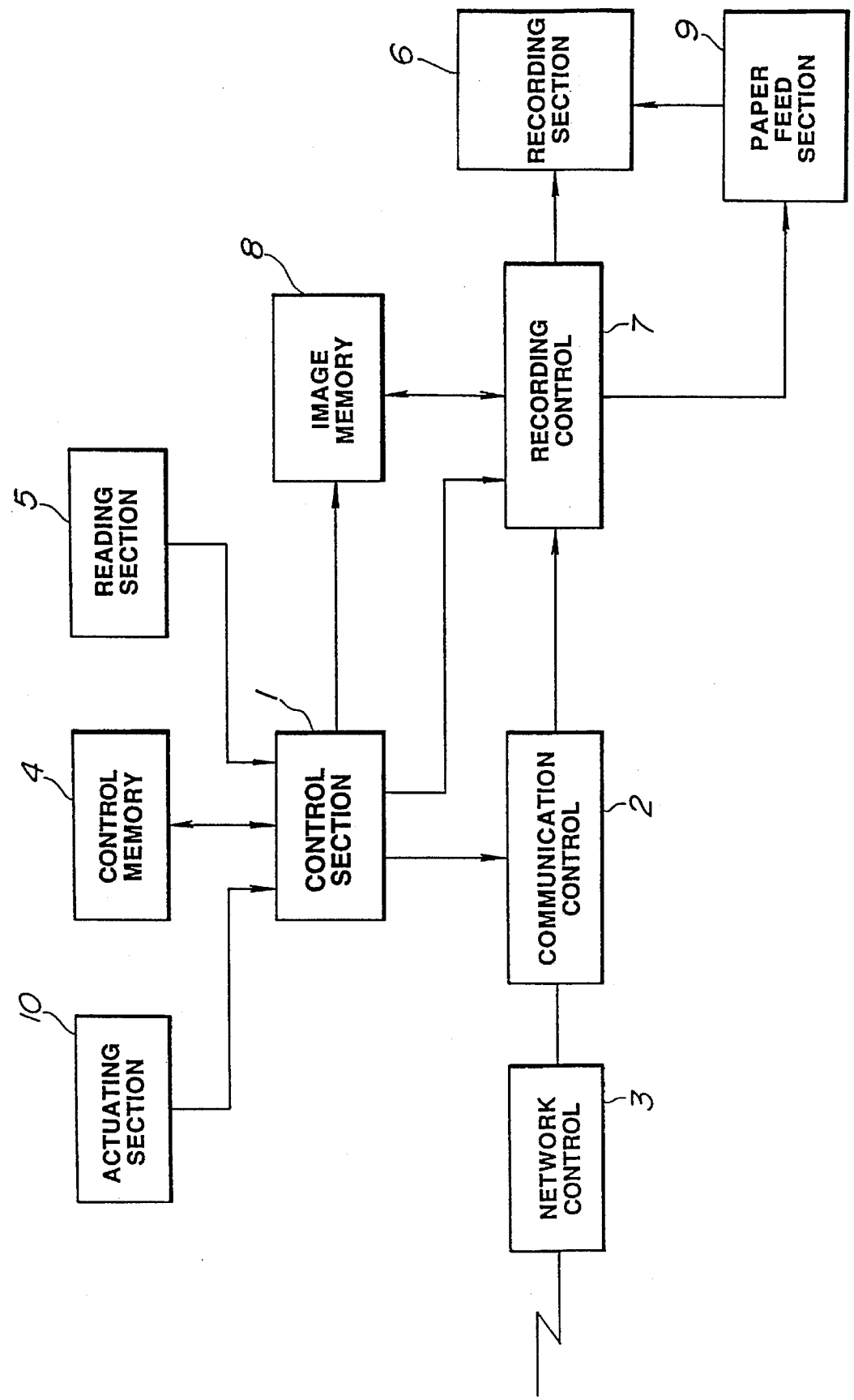
FIG. 1 is a block diagram which schematically illustrates the structure of a facsimile unit for which an apparatus for performing a recording operation by using recording papers each having a standard size as well as a method of controlling the foregoing apparatus in accordance with a preferred embodiment of the present invention are employed.

FIG. 1 is a block diagram which schematically illustrates the structure of a facsimile unit for which an apparatus for performing a recording operation by using recording papers each having a standard size as well as a method of controlling the foregoing apparatus in accordance with the embodiment of the present invention.

The facsimile unit to which the present invention is applied is composed of a control section 1 adapted to carry out individual control such as control for a reading operation, control for a recording operation or the like as well as total control for the apparatus of the present invention, a communication control section 2 adapted to carry out control such as control for a calling operation, control for a signal receiving operation, control for a processing operation of modulating/demodulating a number of data or the like, a network control section 3 for holding a circuit, releasing it or the like operation, a control memory 4 in which various kinds of data are stored in the form of a registration list such as an abbreviated dial or the like, a communication control registration list or the like list, a reading section 5 for reading a manuscript while receiving it as image data, a recording section 6 adapted to output the image data by printing them on a recording paper, a recording control section 7 for controlling a recording operation to be performed by the recording section 6, a recording image memory 8 in which a number of image data to be recorded by a quantity corresponding to a single page are stored, a recording paper feeding section 9 adapted to select one of a plurality of standard type recording papers each having a different size and feed it to the recording section 6, and an actuating section 10 for performing not only an inputting operation for the purpose of inputting information on telephone numbers or the like thereinto but also as an inputting operation for receiving a list output command or the like thereinto.

Figure 2:
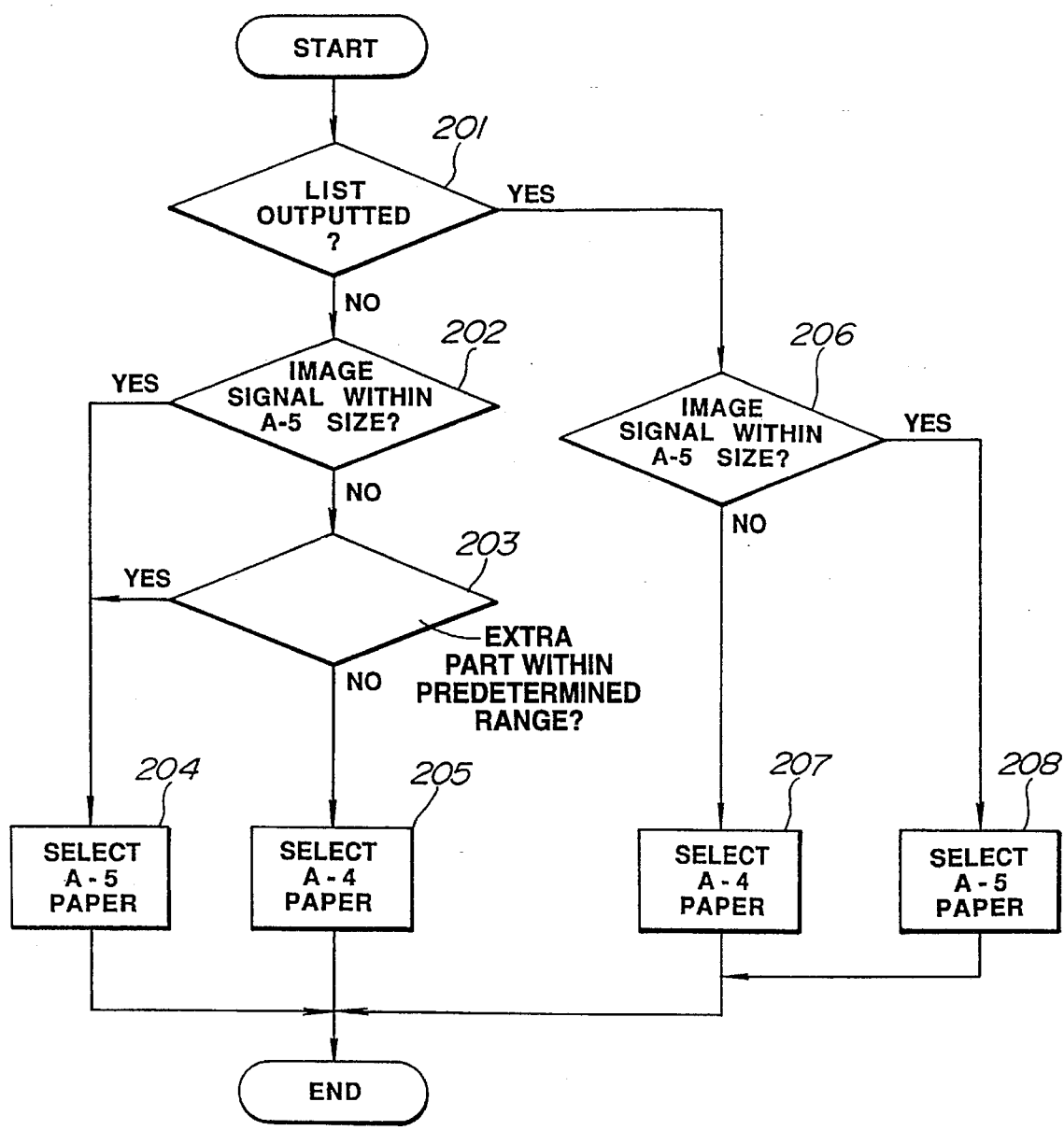
FIG. 2 is a flowchart which illustrates operations to be performed by a recording control section in the apparatus shown in FIG. 1.

Here, it should be noted that recording paper selecting means, printing operation adjusting means, determining means and printing operation controlling means are constructed in conformity with a program adapted to pass through the recording control section 7 and the foregoing program is prepared as illustrated in FIG. 2.

Next, operation of the apparatus of the present invention will be described below.

When the apparatus receives a series of signals, image data input thereinto via the network control section 3 are demodulated by the communication control section 2 and the demodulated image data are then transmitted to the recording control section 7. The recording control section 7 serves to allow the input image data having a quantity corresponding to a single page (inclusive of a blank part on the page) to be stored in the recording image memory 8. At this time, when it is found that a length representative of the stored image data is longer than the length by which an effective recording operation can be performed for a standard type recording paper, the recording control section 7 determines whether the extra part is smaller than a predetermined value or not. For example, in a case where the image data stored in the recording image memory 8 can substantially be received in an A-5 sized recording paper but a length representative of the stored image data is appreciably longer than the length by which an effective recording operation can be performed for the A-5 sized recording paper and the extra part (which is normally the blank part located at the end part of a manuscript in many cases) is smaller than a predetermined value, the recording control section 7 controls the recording paper feeding section 9 so as to allow an A-5 sized standard type recording paper to be fed to the recording section 6. Thereafter, the recording control section 7 reads from the recording image memory 8 the image data having a quantity corresponding to a single page and then transforms them into data of the type available for a printing operation which in turn are output to the recording section 6 from the recording control section 7. This causes the image data having a quantity corresponding to an A-5 sized standard type recording paper to be recorded in the A-5 sized standard type recording paper. At this time, the extra part of the image data in excess of the length by which an effective recording operation can be performed is not printed on the standard type recording paper. Consequently, the extra part of the image data is discarded.

In addition, in a case where the image data stored in the recording image memory 8 can substantially be received in an A-5 sized recording paper but the length representative of the stored image data exceed the length by which an effective recording operation can be performed for the standard type recording paper and the extra part (which is normally the blank part located at the end part of a manuscript in many cases) is in excess of a predetermined value, the recording control section 7 feeds a larger A-4 sized standard type recording paper (which assures that all the image data can be recorded in a single page thereof) from the recording paper feeding section 7 to the recording section 6 and then reads from the recording image memory 8 the image data having a quantity corresponding to a single page so as to allow them to be transformed into data available for a printing operation. Thereafter, the recording control section 7 outputs to the recording section 6 the transformed image data which in turn are recorded on the A-4 sized standard type recording paper as received image data.

In the aforementioned case, when it has been previously determined that a printing operation is performed by using an A-5 sized standard type recording paper or when A-5 sized standard type recording papers only are available for a printing operation, the recording control section 7 carries out control in the following manner. Specifically, the reading control section 7 reads from the recording image memory 8 the image data having a quantity only corresponding to the length by which an effective recording operation can be performed for a single A-5 sized standard type recording paper. Then, first, the image data are printed on a single A-5 sized standard type recording paper. Thereafter, the recording control section 7 reads the remaining image data which in turn are printed on a second A-5 sized standard type recording paper.

Next, when a copying operation is performed such that the content of the manuscript which has been read by the reading section 5 is immediately printed on a recording paper in the recording section 6 so as to allow it to be output therefrom, the recording control section 7 carries out control in such a manner that the image data having a quantity corresponding to a single page which have been input thereinto from the reading section 5 via the control section 1 are once stored in the recording image memory 8, thereafter, the stored image data are transformed into data available for a printing operation and the resultant data are then output to the recording section 6 in which a copying operation is performed. Also at this time, in a case where the image data have a quantity in excess of the length by which a recording operation can be performed for an object to be printed, i.e., a standard type recording paper and the extra part is smaller than a predetermined value, the control section 7 carries out control in such a manner as to discard the extra part of the image data and then perform a printing operation for the extra image data part in the same manner as the aforementioned case where the received image data are recorded. On the contrary, in a case where the extra part of the image data is larger than the predetemined value, the image data are output by printing them on a standard type recording paper having a larger size.

Next, description will be made below as to a control for a recording operation to be performed when sending/receiving signal lists are output in response to a list output command from the actuating section 10. When the list output command from the actuating section 10 is input to the control section 1, the control section 1 has access to the control memory 4 so as to read the relevant list data therefrom and edit them. Thereafter, the edited data are transmitted to the recording control section 7. The recording control section 7 serves to allow the input and edited data to be stored in the recording image memory 8 by a quantity corresponding to a single page. At this time, when the recording control section 7 knows that the image data have a length in excess of the length by which an effective recording operation can be performed for a standard type recording paper, e.g., an A-5 sized standard type recording paper, the recording control section 7 causes the recording paper feeding section 9 to feed an A-4 sized standard type recording paper to the recording section 6. Subsequently, the recording control section 7 reads the image data (list data) from the recording image memory 8 and then transforms the into data available for a printing operation. Thereafter, the transformed data are output to the recording section 6 from which list data are output by printing them on an A-4 sized standard type recording paper having a larger size. In addition, in a case where the image data have a length in excess of the length by which an effective recording operation can be performed for an A-4 sized standard type recording paper and moreover a recording paper which can be fed to the recording section 6 is limited only to an A-5 sized paper, the recording control section 7 carries out control in the following manner. Specifically, the recording control section 7 reads from the recording image memory 8 the image data having the length by which an effective recording operation can correctly be performed for an A-5 sized standard type recording paper. Then, first, the read image data are printed on a single A-5 sized standard type recording paper in the recording section 6. Thereafter, the recording control section 7 reads the remaining image data which in turn are printed on a second A-5 sized standard type recording paper.

It goes without saying that when it is found, before the received image data, the copy data, and the list data are output from the recording image memory 8, that the image data stored in the recording image memory 8 while having the quantity corresponding to a single page has a length remaining within the range where an effective recording operation can be performed for a predetermined standard type recording paper, the image data are output by feeding the standard type recording paper to the recording section 6 and then printing them thereon.

Next, operations of the recording control section 7 in the apparatus in accordance with the aforementioned embodiment of the present invention will be described in more detail below with reference to flowcharts shown in FIG. 2 and FIG. 3.

It should be noted that the flowchart shown in FIG. 2 will be described below particularly with respect to a case where the recording paper feeding section 9 can feed an A-5 sized or A-4 sized standard type recording paper to the recording section 6.

At a step 201, the recording control section 7 determines whether the kind of image data to be output from the recording section 6 at this time is a sending/receiving signal record list output or not. If the result derived from the determination at the step 201 is not a list output, the program goes to a step 202. On the contrary, if the result derived from the determination at the step 201 is a list output, the program goes to a step 206. At the step 206, the recording control section 7 determines whether or not the image data stored in the recording image memory 8 while having a quantity corresponding to a single page exceed the length by which an effective recording operation can be performed for an A-5 sized standard type recording paper. When it is found from the result derived from the determination at the step 206 that the stored image data do not exceed the foregoing length, the program goes to a step 208. On the contrary, if it is found that the stored image data exceed the same, the program goes to a step 207. At the step 207, the recording paper feeding section 9 feeds an A-4 sized standard type recording paper to the recording section 6 from which the image data are output by printing them on the A-4 sized standard type recording paper. In the case where the program goes to the step 208, after the recording paper feeding section 9 feeds an A-5 sized standard type recording paper to the recording section 6, the image data stored in the recording image memory 8 are output by printing them on the A-5 sized standard type recording paper.

Next, when it is found from the result derived from the determination at the step 201 that the image data to be printed are not list data but signal receiving data and copy data, the program goes to a step 202. At the step 202, the recording control section 7 determines whether or not the image data to be printed which have been stored in the recording image memory 8 have a length remaining within the range where an effective printing operation can be performed for an A-5 sized standard type recording paper. When it is found from the result derived from the determination at the step 202 that the image data have a length within the foregoing range, the program goes to a step 204. Otherwise, the program goes to a step 203. At the step 203, the recording control section 7 determines based on the result derived from the determination at the step 202 whether the extra part in excess of the length by which an effective recording operation can be performed remains within a predetemined range or not. When it is found from the determination derived at the step 203 that the extra part remains within the predetermined range, the program goes to a step 204. Otherwise, the program goes to a step 205. At the step 204, the recording paper feeding section 9 feeds an A-5 sized standard type recording paper to the recording section 6 and then records the image data to be recorded on the standard type recording paper by a quantity corresponding to a single page. In the case where the program goes to the step 205, the recording paper feeding section 9 feeds an A-4 sized standard type recording paper to the recording section 6 and then records the image data to be printed on the standard type printing paper by a quantity corresponding to a single page.

Next, description will be made below with respect to a case where the recording paper feeding section 9 is adapted to feed A-5 sized standard type recording papers only to the recording section 6, with reference to the flowchart shown in FIG. 3.

Figure 3:
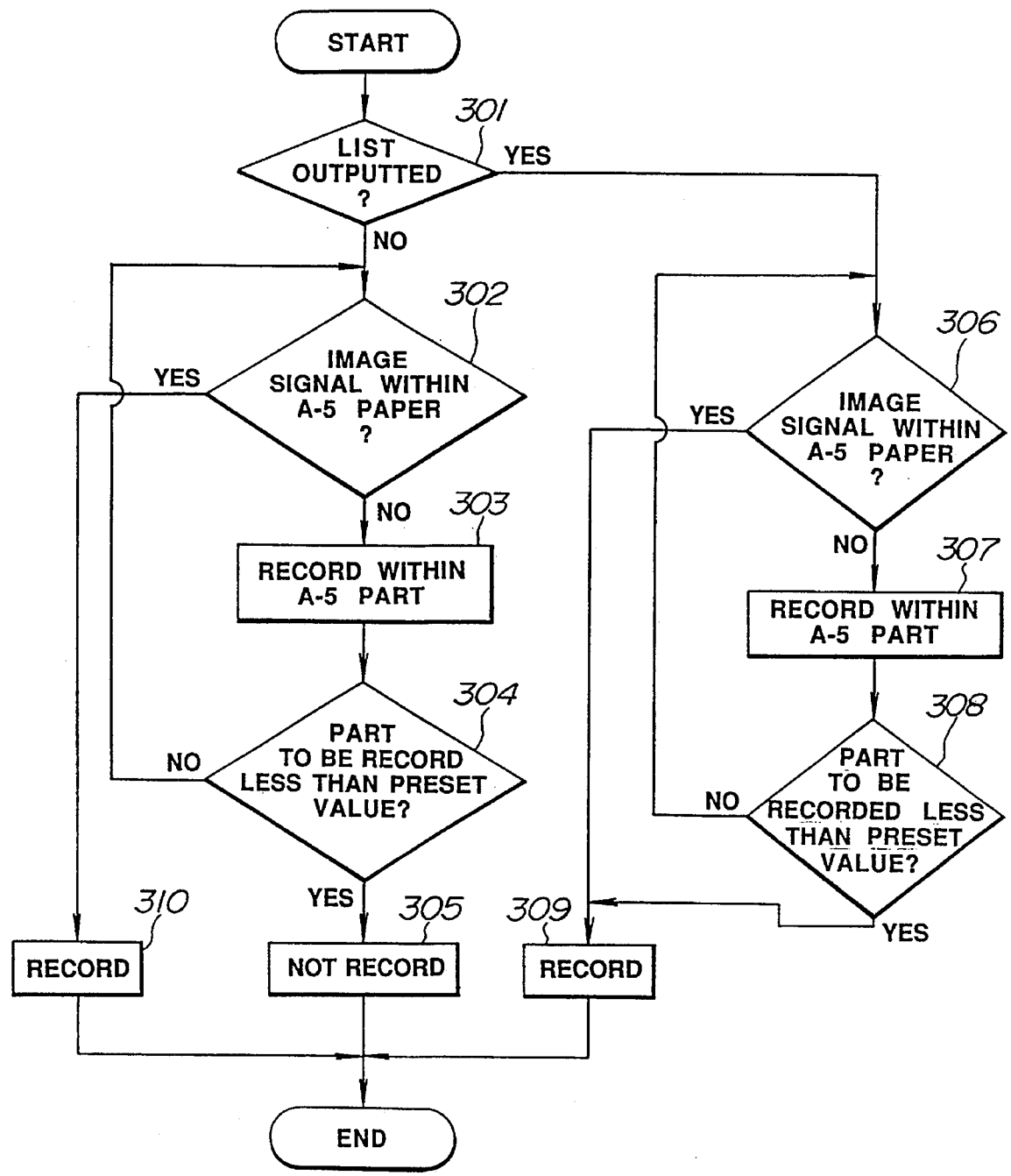
FIG. 3 is another flowchart which illustrates operations to be performed by the recording control section in the apparatus shown in FIG. 1.

Referring to FIG. 3, at a step 301, the recording control section 7 determines whether the kind of image data to be output from the recording section 6 at this time is a sending/receiving signal record list output or not. If the result derived from the determination at the step 301 is not a list output, the program goes to a step 302. On the contrary, if the result derived from the determination at the step 301 is a list output, the program goes to a step 306. At the step 306, the recording control section 7 determines whether or not the image data stored in the recording image memory 8 while having a quantity corresponding to a single page exceed the length by which an effective recording operation can be performed for an A-5 sized standard type recording paper. When it is found from the result derived from the determination at the step 306 that the stored image data exceed the foregoing length, the program goes to a step 307. At the step 307, the recording paper feeding section 9 feeds an A-5 sized standard type recording paper to the recording section 6 from which among the image data stored in the recording image memory 8, a part of the length by which an effective recording operation can be performed for the A-5 sized standard type recording paper is output by printing it on the A-5 sized standard type recording paper.

Next, the recording control section 7 determines whether or not among the image data stored in the recording image memory 8, the remaining part of the length by which any effective recording operation has not been performed for the A-5 sized standard type printing paper is less than the predetermined value which has been preset (step 308). When it is found from the result derived from the determination at the step 308 that the remaining part of the foregoing length is less than the predetermined value, it is printed on another A-5 sized standard type recording paper (step 309).

It should be noted that when it is found from the result derived from the determination at the step 306 that the image data stored in the recording image memory 8 while having a quantity corresponding to a single page remain within the range of the length by which an effective recording operation can be performed for an A-5 sized standard type recording paper, the program goes to the step 309 at which the image data stored in the recording image memory 8 while having a quantity corresponding to a single page are printed on the A-5 sized standard type recording paper.

In addition, when it is found from the result derived from the determination at the step 308 that the remaining part of the length by which any effective recording operation has not been performed for the A-5 sized standard type recording paper is more than the predetermined value which has been preset, the program goes back to the step 306. Thereafter, determination is repeatedly made between the step 306 and the step 308 until the remaining part of the length by which the image data have not been recorded on the A-5 sized standard type recording paper is reduced less than the predetermined value.

Next, when it is found from the result derived from the determination at the step 301 that the image data to be printed are not list data but received data or copy data, the program goes to the step 302 at which the recording control section 7 determines whether or not the image data to be printed which have been stored in the recording memory 8 while having a quantity corresponding to a single page exceed the length by which an effective recording operation can be performed for an A-5 sized standard type recording paper. When it is found from the result derived from the determination at the step 302 that the stored image data exceed the foregoing length, the program goes to a step 303. At the step 303, the recording paper feeding section 9 feeds an A-5 sized standard type recording paper to the recording section 6 from which among the image data stored in the recording image memory 8, a part of the length by which an effective recording operation can be performed for the A-5 sized standard type recording paper is output by printing it on the A-5 sized standard type recording paper. Then, the recording control section 7 determines whether or not among the image data stored in the recording image memory 8, the remaining part of the length by which any effective recording operation has not been performed for the A-5 sized standard type recording paper is less than the predetermined value which has been preset (step 304). When it is found from the result derived from the determination at the step 304 that the remaining part of the foregoing length is less than the predetermined value, it is erased without any printing operation performed therefor (step 305).

It should be noted that when it is found from the result derived from the determination at the step 302 that the image data stored in the recording image memory 8 while having a quantity corresponding to a single page remain within the range of the length by which an effective recording operation can be performed for an A-5 sized standard type recording paper, the program goes to a step 310 at which the stored image data are printed on the A-5 sized standard type recording paper.

Additionally, when it is found from the result derived from the determination at the step 304 that the remaining part of the length by which any effective recording operation has not been performed for the A-5 sized standard type recording paper is more than the predetermined value which has been preset, the program goes back to the step 302. Thereafter, determination is repeatedly made between the step 302 and the step 304 until the remaining part of the foregoing length is reduced less than the predetermined value.

As will be apparent from the above description, according to the embodiment of the present invention, in a case where the received image data, the received copy data or the like each having a quantity corresponding to a single page exceed the length by which an effective recording operation can be performed for a standard type recording paper and moreover the extra part of the data remains within a predetermined range, the recording control section 7 discards the extra part and performs a processing operation for printing the received image data or the received copy data on the standard type recording paper, resulting in useless consumption of the recording paper being prevented reliably. However, in any case where at the time of a sending/receiving signal record list output, the list data having a quantity corresponding to a single page exceeds the length by which an effective recording operation can be performed for the standard type recording paper, the recording paper feeding section 9 feeds to the recording section 6 a standard type recording paper having a size large enough to assure than an effective recording operation can be performed so as to allow all the list data to be printed on a single page of standard type recording paper. Thereafter, the recording control section 7 carries out control such that the list data are output by printing them on a single page of standard type recording paper or they are output by printing them on two pages of standard type recording papers. Therefore, the apparatus of the present invention can prevent important data from failing to be recorded and printed.

According to the embodiment of the present invention, the apparatus is constructed in the above-described manner such that in any case where at the time of a sending/receiving signal record list output, the list data having a quantity corresponding to a single page exceeds the length by which an effective recording operation can be performed for the standard type recording paper, the recording paper feeding section 9 feeds to the recording section 6 a standard type recording paper having a size large enough to assure that an effective recording operation can be performed so as to allow all the list data to be printed on a single page of standard type recording paper, whereby the list data are output by printing them on a single page of standard type recording paper or printing them on two pages of standard type recording papers. However, the aforementioned embodiment is merely illustrative and the present invention should not be limited only to this. Alternatively, the apparatus of the present invention may be constructed such that control is carried out in the above-described manner also with respect to other kinds of data rather than the sending/receiving signal record list, provided that all information on the data are important and image data to be processed are the kind of data including information within the critical range relative to recording papers each having a standard size.

What is claimed is:

1. An apparatus for performing a recording operation by using standard type recording papers having plural sizes, comprising:

recording paper selecting means for selecting a desired one of a plurality of standard type recording papers, including a first standard size recording paper and a second standard size recording paper, each of the standard size recording papers having a different effective recordable length, the second standard size recording paper having an effective recording length larger than the first standard size recording paper;

determining means for determining whether recording image data to be recorded is a normal type image data or a special type image data;

first recording control means, if said recording image data is the normal type image data, for checking whether or not said normal recording image data is within the effective recordable length of the first standard size recording paper and, if said normal recording image data is within the effective recordable length, for recording said normal recording image data onto the first standard size recording paper and, if said normal recording image data exceeds said effective recordable length of the first standard size recording paper and if an exceeding part of said normal recording image data is less than a predetermined value, for discarding said exceeding part and recording a remaining part of said normal recording image data other than said exceeding part on the first standard size recording paper; and second recording control means, if said recording data is the special type image data, for checking whether or not said special recording image data is within the effective recordable length of the first standard size recording paper and, if said special recording image data is within the effective recordable length, for recording said special recording image data onto the first standard size recording paper and, if said special recording image data exceeds said effective recordable length of the first standard size recording paper, for changing the first standard size recording paper to the second standard size recording paper on which said special recording image data can be completely recorded and recording said special recording image data on the second standard size recording paper.

2. The apparatus as claimed in claim 1, wherein said first recording control means further includes means, if said exceeding part of said normal recording image data exceeds said predetermined value, for changing the first standard size recording paper selected by said recording paper selecting means to the second standard size recording paper on which said normal recording image data can be completely recorded and recording said normal recording image data on the second standard size recording paper.

3. The apparatus as claimed in claim 2, wherein said second standard size recording paper is one size larger than said first standard size recording paper.

4. The apparatus as claimed in claim 1, wherein said second recording control means, if said special recording image data exceeds the effective recordable length of the first standard size recording paper selected by said recording paper selecting means, changes the first standard size recording paper to the second standard size recording paper which is larger than the first standard size recording paper by one size and records said special recording image data on the second standard size recording paper.

5. The apparatus as claimed in claim 1, wherein said apparatus is a recording apparatus employable for a facsimile apparatus, and said special type image data corresponds to a transmission/reception record of said facsimile apparatus formed in said facsimile apparatus.

6. An apparatus for performing a recording operation by using standard type recording paper, comprising:

recording paper supplying means for supplying a standard type recording paper having a predetermined size including a first standard size recording paper and a second standard size recording paper, each of the standard size recording papers having a different effective recordable length, the second standard size recording paper having an effective recording length larger than the first standard size recording paper;

determining means for determining whether recording image data to be recorded is a normal type image data or a special type image data;

first recording control means, if said recording image data is the normal type image data, for checking whether or not said normal recording image data is within the effective recordable length of the first standard size recording paper and, if said normal recording image data is within the effective recordable length of the first standard size recording paper, for recording said normal recording image data onto the first standard size recording paper and, if said normal recording image data exceeds said effective recordable length of the first standard size recording paper and if an exceeding part of said normal recording image data is less than a predetermined value, for discarding said exceeding part and recording a remaining part of said normal recording image data other than said exceeding part on the first standard size recording paper; and second recording control means, if said recording data is the special type image data, for checking whether or not said special recording image data is within the effective recordable length of the first standard size recording paper and, if said special recording image data is within the effective recordable length, for recording said special recording image data onto the first standard size recording paper and, if said special recording image data exceeds said effective recordable length of the first standard size recording paper, for changing the first standard size recording paper to the second standard size recording paper on which said special recording image data can be completely recorded and recording said special recording image data on the second standard size recording paper.

7. The apparatus as claimed in claim 6, wherein said first recording control means further includes means, if the exceeding part of said normal recording image data exceeds the predetermined value, for recording said normal recording image data on two sheets of the first standard size recording paper.

8. The apparatus as claimed in claim 6, wherein said apparatus is a recording apparatus employable for a facsimile apparatus, and said special type image data corresponds to a transmission/reception record of said facsimile apparatus formed in said facsimile apparatus.

9. A method of controlling an apparatus for performing a recording operation by using standard type recording papers having plural sizes, comprising the steps of:

(i) initially selecting a first standard size recording paper from a plurality of standard type recording papers including the first standard size recording paper and a second standard size recording paper, each of the standard size recording papers having a different effective recordable length, the second standard size recording paper having an effective recording length larger than the first standard size recording paper;

(ii) determining whether recording image data to be recorded is a normal type image data or a special type image data;

(iii) judging, if in said second step said recording image data is the normal type image data, whether or not said normal recording image data is within the effective recordable length of the first standard size recording paper;

(iv) recording, if it is judged in the third step that said normal recording image data is within the effective recordable length, said normal recording image data onto the first standard size recording paper;

(v) judging, if it is judged in the third step that said normal recording image data exceeds the effective recordable length, whether or not an exceeding part of said normal recording image data is less than a predetermined value;

(vi) discarding, if it is judged in the fifth step that said exceeding part of said normal recording image data is less than the predetermined value, said exceeding part of said normal recording image data and recording a remaining part of said normal recording image data other than said exceeding part on the first standard size recording paper;

(vii) changing, if it is judged in the fifth step that said exceeding part of said normal recording image data exceeds the predetermined value, the first standard size recording paper selected in the first step to the second standard size recording paper on which said normal recording image data can be fully recorded and recording said normal recording image data on the second standard size recording paper;

(viii) judging, if in the second step said recording image data is determined to be the special type image data, whether or not said special recording image data is within the effective recordable length of the first standard size recording paper selected in the first step;

(ix) recording, if it is judged in the eighth step that said special recording image data is within the effective recordable length, said special recording image data onto the first standard size recording paper selected in the first step; and (x) changing, if it is judged in the eighth step that said special recording image data exceeds the effective recordable length, the first standard size recording paper to the second standard size recording paper on which said special recording image data can be completely recorded and recording said special recording image data on the second standard size recording paper.

10. A method of controlling an apparatus for performing a recording operation by using standard type recording papers, comprising the steps of:

(i) supplying a standard type recording paper having one of a first standard size and a second standard size, each of the standard size recording papers having a different effective recordable length;

(ii) determining whether recording image data to be recorded is a normal type image data or a special type image data;

(iii) judging, if in said second step said recording image data is the normal type image data, whether or not said normal recording image data is within the effective recordable length of said supplied standard type recording paper supplied in the first step;

(iv) recording, if it is judged in the third step that said normal recording image data is within the effective recordable length of said supplied standard type recording paper, said normal recording image data onto said supplied standard type recording paper;

(v) judging, if it is judged in the third step that said normal recording image data exceeds the effective recordable length, whether or not an exceeding part of said normal recording image data is less than a predetermined value;

(vi) discarding, if it is judged in the fifth step that said exceeding part of said normal recording image data is less than the predetermined value, said exceeding part and recording a remaining part of said normal recording image data other than said exceeding part on said supplied standard type recording paper;

(vii) recording, if it is judged in the fifth step that said exceeding part of said normal recording image data exceeds the predetermined value, said normal recording image data on two sheets of said supplied standard type recording paper;

(viii) judging, if in the second step said recording image data is determined to be the special type image data, whether or not said special recording image data is within the effective recordable length of said supplied standard type recording paper;

(ix) recording, if it is judged in the eighth step that said special recording image data is within the effective recordable length, said special recording image data onto said supplied standard type recording paper; and (x) recording, if it is judged in the eighth step that said special recording image data exceeds the effective recordable length, said special recording image data on two sheets of said supplied standard type recording paper.

* * * * *